United States Patent
Kou et al.

(10) Patent No.: US 12,131,842 B2
(45) Date of Patent: Oct. 29, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kyousyou Kou, Mie (JP); Housei Mizuno, Mie (JP); Daichi Fukushima, Mie (JP); Miyu Aramaki, Mie (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 343 days.

(21) Appl. No.: 17/439,964

(22) PCT Filed: Mar. 17, 2020

(86) PCT No.: PCT/JP2020/011736
§ 371 (c)(1),
(2) Date: Sep. 16, 2021

(87) PCT Pub. No.: WO2020/203260
PCT Pub. Date: Oct. 8, 2020

(65) Prior Publication Data
US 2022/0230779 A1 Jul. 21, 2022

(30) Foreign Application Priority Data
Apr. 5, 2019 (JP) .................................. 2019-072879

(51) Int. Cl.
*H01B 7/00* (2006.01)
*B60R 16/02* (2006.01)
(Continued)

(52) U.S. Cl.
CPC ....... *H01B 7/0045* (2013.01); *B60R 16/0215* (2013.01); *H01B 7/0846* (2013.01); *H01B 7/40* (2013.01)

(58) Field of Classification Search
CPC ...... H01B 7/08; H01B 7/0838; H01B 7/0045; H01B 7/0846; B60R 16/0215; H02G 3/0418; H02G 3/0456; H02G 3/32
See application file for complete search history.

(56) References Cited

U.S. PATENT DOCUMENTS 4,761,517 A * 8/1988 Massit .................. F17C 13/008
174/268
4,874,908 A * 10/1989 Johansson .............. H02B 1/202
439/402

(Continued)

FOREIGN PATENT DOCUMENTS

| CN | 102396039 | 3/2012 |
| CN | 102729920 | 10/2012 |

(Continued)

OTHER PUBLICATIONS

China Office Action issued in China Patent Application No. 202080024021.0, dated Oct. 12, 2022, along with an English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes: a sheet; and a plurality of wire-like transmission members disposed on the sheet, wherein the plurality of wire-like transmission members include at least one first wire-like transmission member fixed to the sheet at a plurality of first positions and at least one second wire-like transmission member fixed to the sheet at a plurality of second positions, and the first positions and (Continued)

the second positions are alternately provided along an extension direction of the wire-like transmission members in a region where the first wire-like transmission member and the second wire-like transmission member are parallelly arranged.

6 Claims, 3 Drawing Sheets

(51) Int. Cl.
*H01B 7/08* (2006.01)
*H01B 7/40* (2006.01)

(56) References Cited

U.S. PATENT DOCUMENTS

| | | | | |
|---|---|---|---|---|
| 5,502,287 | A | * | 3/1996 | Nguyen ............... H01B 7/0846 174/117 A |
| 10,867,721 | B2 | | 12/2020 | Ishida et al. |
| 2005/0068250 | A1 | * | 3/2005 | Cornec ............... H02G 3/32 343/702 |
| 2006/0233513 | A1 | * | 10/2006 | Klein ............... H02G 11/00 385/147 |
| 2012/0261184 | A1 | | 10/2012 | Kitamura |
| 2017/0145189 | A1 | * | 5/2017 | Kang ............... C08K 7/00 |
| 2020/0172027 | A1 | * | 6/2020 | Mizuno ............... H02G 3/30 |

FOREIGN PATENT DOCUMENTS

| | | |
|---|---|---|
| JP | 57-128712 | 8/1982 |
| JP | 61-288312 | 12/1986 |
| JP | 2018-137208 | 8/2018 |
| JP | 2018-207625 | 12/2018 |
| JP | 2019-003925 | 1/2019 |

OTHER PUBLICATIONS

International Search Report issued in International Patent Application No. PCT/JP2020/011736, dated May 26, 2020, along with an English translation thereof.

* cited by examiner

WIRING MEMBER

TECHNICAL FIELD

The present disclosure relates to a wiring member.

BACKGROUND ART

Patent Document 1 discloses a wire harness in which an insulating covering of an electrical wire is welded to a sheet-like functional exterior member.

PRIOR ART DOCUMENTS

Patent Documents

Patent Document 1: Japanese Patent Application Laid-Open No. 2018-137208

SUMMARY

Problem to be Solved by the Invention

Required is that a wire harness described in Patent Document 1 can be simply manufactured while keeping an electrical wire to be appropriately held by a functional exterior member.

Accordingly, an object is to provide a technique of simply manufacturing a wiring member in which a wire-like transmission member is fixed to a sheet while keeping the wire-like transmission member to be appropriately held by the sheet.

Means to Solve the Problem

A wiring member according to the present disclosure includes: a sheet; and a plurality of wire-like transmission members disposed on the sheet, wherein the plurality of wire-like transmission members include at least one first wire-like transmission member fixed to the sheet at a plurality of first positions and at least one second wire-like transmission member fixed to the sheet at a plurality of second positions, and the first positions and the second positions are alternately provided along an extension direction of the wire-like transmission members in a region where the first wire-like transmission member and the second wire-like transmission member are parallelly arranged.

Effects of the Invention

According to the present disclosure, a wiring member in which a wire-like transmission member is fixed to a sheet can be simply manufactured while keeping the wire-like transmission member to be appropriately held by the sheet.

DESCRIPTION OF EMBODIMENT(S)

[Description of Embodiment of Present Disclosure]

Embodiments of the present disclosure are listed and described firstly.

A wiring member according to the present disclosure is as follows.

(1) A wiring member includes: a sheet; and a plurality of wire-like transmission members disposed on the sheet, wherein the plurality of wire-like transmission members include at least one first wire-like transmission member fixed to the sheet at a plurality of first positions and at least one second wire-like transmission member fixed to the sheet at a plurality of second positions, and the first positions and the second positions are alternately provided along an extension direction of the wire-like transmission members in a region where the first wire-like transmission member and the second wire-like transmission member are parallelly arranged. Accordingly, a portion between fixing positions hardly snaggles with the wire-like transmission members parallelly arranged even when a distance between the fixing positions are increased. As a result, a wiring member in which a wire-like transmission member is fixed to a sheet can be simply manufactured while keeping the wire-like transmission member to be appropriately held by the sheet.

(2) It is applicable that the plurality of first wire-like transmission members are fixed at the first positions, and the plurality of second wire-like transmission members are fixed at the second positions. Accordingly, positions where the plurality of wire-like transmission members are fixed can be alternately provided. The plurality of wire-like transmission members can be fixed to one fixing position, thus the wiring member can be simply manufactured.

(3) It is applicable that the sheet includes a first layer formed into a sheet-like shape and a second layer provided on a main surface of the first layer, the second layer is a layer mediating a bonding between the first layer and the wire-like transmission members and includes a plurality of partial second layers provided to be mutually separated along an extension direction of the wire-like transmission members, and one of the partial second layers which can fix another wire-like transmission member is located on a lateral side of at least one of the partial second layers in the first positions and the second positions. Accordingly, the partial second layer which is not bonded to the wire-like transmission member is located in the wiring member. When a repaired component is bonded to a sheet again after a wire-like transmission member which needs to be repaired is detached from the sheet in the wiring member, the repaired component can be bonded using a vacant partial second layer.

[Details of Embodiment of Present Disclosure]

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment

Figure 1:
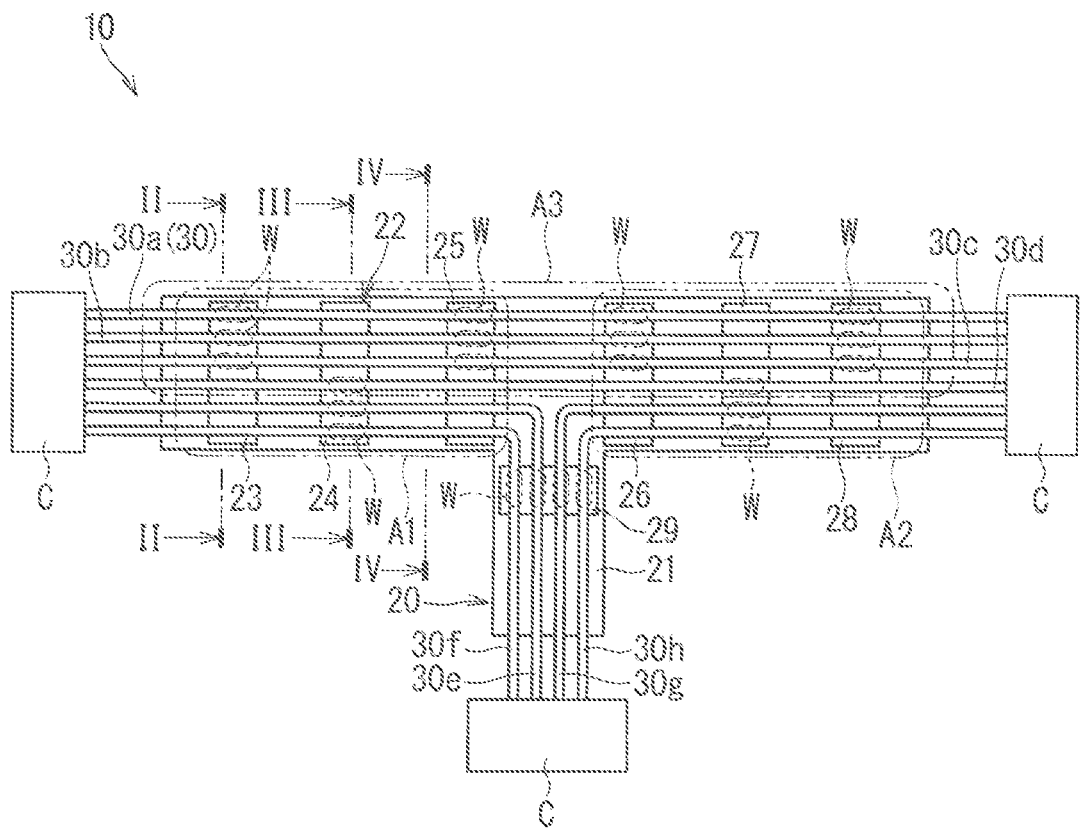
FIG. 1 is a plan view illustrating a wiring member according to an embodiment.
Figure 2:
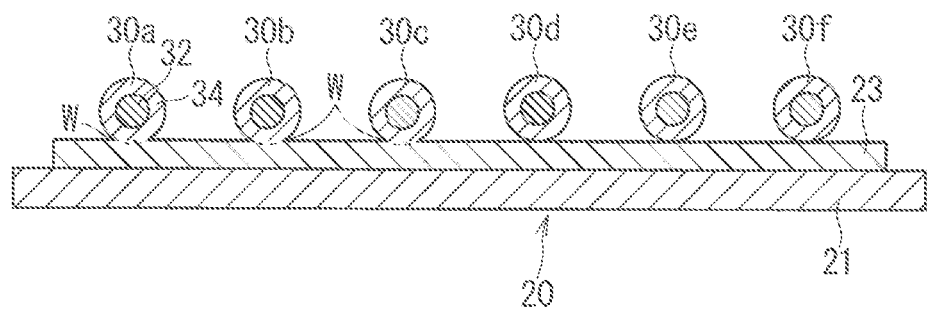
FIG. 2 is a schematic cross-sectional view along a II-II line in FIG. 1.
Figure 3:
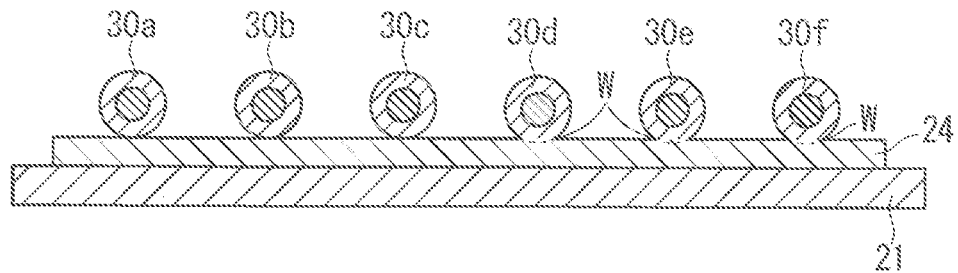
FIG. 3 is a schematic cross-sectional view along a III-III line in FIG. 1.
Figure 4:
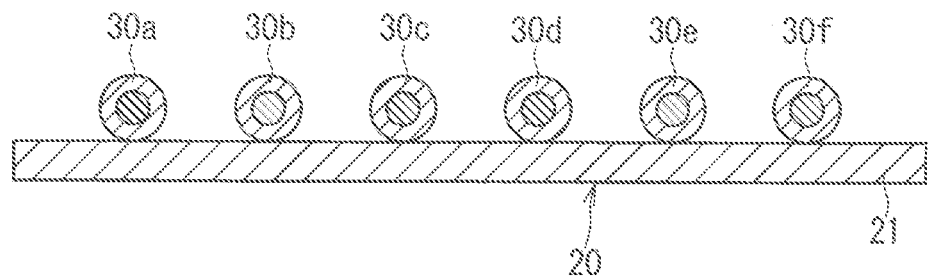
FIG. 4 is a schematic cross-sectional view along a IV-IV line in FIG. 1.

A wiring member according to an embodiment is described hereinafter. FIG. 1 is a plan view illustrating a wiring member 10 according to the embodiment. Dashed-two dotted lines to which signs A1, A2, and A3 are assigned in FIG. 1 indicate regions where a plurality of wire-like transmission members 30 are parallelly arranged. Dashed-two dotted lines to which a sign W is assigned in FIG. 1 indicate positions where a sheet 20 and the wire-like transmission member 30 are fixed. FIG. 2 is a schematic cross-sectional view along a II-II line in FIG. 1. FIG. 3 is a schematic cross-sectional view along a III-III line in FIG. 1. FIG. 4 is a schematic cross-sectional view along a IV-IV line in FIG. 1.

The wiring member 10 includes a sheet 20 and a plurality of (eight herein) wire-like transmission members 30. When the eight wire-like transmission members 30 need to be distinguished from each other, they are referred to as the wire-like transmission members 30a, 30b, 30c, 30d, 30e, 30f, 30g, and 30h in some cases hereinafter.

The wire-like transmission member 30 is fixed to the sheet 20. The wire-like transmission member 30 is disposed on one main surface of the sheet 20. The sheet 20 keeps the wire-like transmission member 30 in a state of extending along a predetermined route. The sheet 20 keeps the plurality of wire-like transmission members 30 in a state of being arranged side by side. The wiring member 10 is thereby flatly formed.

The wire-like transmission member 30 is a wire-like member transmitting an electrical power or light, for example. The wire-like transmission member 30 includes a transmission wire body 32 and a covering 34. For example, the wire-like transmission member may be a general wire having a core wire and a covering around the core wire, or may also be a bare conductive wire, a shielded wire, an electrical cable, an enamel wire, a nichrome wire, a coaxial wire, or an optical fiber. The wire-like transmission member transmitting the electrical power may be various kinds of signal lines or various kinds of power lines. The wire-like transmission member may be a single wire-like object or a composite object of a plurality of wire-like objects (a twisted wire and a cable made up of a plurality of wire-like objects covered by a sheath).

Routes of the plurality of wire-like transmission members 30 on the sheet 20 are not particularly limited, but can be appropriately set. The route of the wire-like transmission member 30 is made up of an appropriate combination of a straight part and a curved part, for example. The straight part is a route extending straight on the sheet 20. The curved part is a route curved on the sheet 20. A curvature radius and a length of the curved part are appropriately set. In the example illustrated in FIG. 1, the wire-like transmission members 30a, 30b, 30c, and 30d are made up of only the straight parts. The wire-like transmission members 30e, 30f, 30g, and 30h include the straight parts and the curved parts. The curved part is located between the two straight parts in each of the wire-like transmission members 30e, 30f, 30g, and 30h. The wire-like transmission members 30e, 30f, 30g, and 30h extend in parallel to the wire-like transmission members 30a, 30b, 30c, and 30d in one of the two straight parts.

The wire-like transmission members 30e, 30f, 30g, and 30h extend in different directions from parts extending in parallel to the wire-like transmission members 30a, 30b, 30c, and 30d via curved parts to branch from the wire-like transmission members 30a, 30b, 30c, and 30d. In this manner, branches may be or may not be formed in the plurality of wire-like transmission members 30 on the sheet 20. The wire-like transmission members 30 do not intersect with each other in the example illustrated in FIG. 1, however, the wire-like transmission members 30 may intersect with each other. An intersection part of the wire-like transmission members 30 may be provided on the sheet 20, or may be provided outside the sheet 20.

An end portion of the wire-like transmission member 30 extends from the sheet 20 to be located outside the sheet 20. A middle portion of the wire-like transmission member 30 except for the end portion is disposed on the sheet 20. The end portion of the wire-like transmission member 30 may also be located on the sheet 20.

The end portion of the wire-like transmission member 30 is connected to an apparatus not shown in the drawings, for example. The apparatus transmits or receives an electrical signal or an optical signal via the wire-like transmission member 30. Alternatively, the apparatus receives a power supply or distributes electrical power via the wire-like transmission member 30. In the example illustrated in FIG. 1, each end portion of the wire-like transmission member 30 is incorporated into a connector C. The connector C is connected to the apparatus. It is also applicable that the wire-like transmission member 30 is directly introduced in the apparatus to be directly connected to an electrical element in the apparatus.

The sheet 20 is formed into a shape along a route of the plurality of wire-like transmission members 30. In the example illustrated in FIG. 1, the route of the plurality of wire-like transmission members 30 has a T-like shape, thus the sheet 20 is also formed into a T-like shape. It is sufficient that the sheet 20 keeps the plurality of wire-like transmission members 30 in a state of following a predetermined route, thus needs not be formed into a shape along the route of the plurality of wire-like transmission members 30. For example, applicable is a sheet formed into a quadrangular shape larger than the T-like sheet 20 illustrated in FIG. 1.

Each of the wire-like transmission members 30 is fixed to the sheet 20 at a plurality of positions located away from each other along an extension direction. A position where the sheet and the wire-like transmission member are fixed is referred to as a fixing position W in some cases hereinafter. It is sufficient that the wire-like transmission member 30 is fixed at a plurality of positions to be disposed along a constant route on the sheet 20 along the extension direction. A specific configuration for forming a fixing state of the sheet 20 and the wire-like transmission member 30 is not particularly limited. Described hereinafter is an example that the sheet 20 and the wire-like transmission member 30 are welded. That is to say, a part of at least one of the wire-like transmission member 30 and the sheet 20 is melted and adheres to the other side member. At this time, a portion where the wire-like transmission member 30 and the sheet 20 adhere to each other (the fixing position W in the example illustrated in FIG. 1) constitutes a welding part. The wire-like transmission member 30 and the sheet 20 may be welded by ultrasonic welding or thermal welding. It is also applicable that a surface of at least one of the wire-like transmission member 30 and the sheet 20 is melted by a solvent to weld the wire-like transmission member 30 and the sheet 20.

The sheet 20 includes a first layer 21 and a second layer 22. The first layer 21 is formed into a sheet-like shape. The second layer 22 is provided on a main surface of the first layer 21. The second layer 22 is a layer mediating a bonding (welding herein) of the first layer 21 and the wire-like transmission member 30. The second layer 22 includes a plurality of (seven herein) partial second layers 23, 24, 25, 26, 27, 28, and 29. The plurality of partial second layers 23, 24, 25, 26, 27, 28, and 29 are provided to be separated from each other along the extension direction of the wire-like transmission member 30.

Materials constituting the first layer 21 and the second layer 22 are not particularly limited, but may contain resin such as polyvinyl chloride (PVC), polyethylene (PE), polyethylene terephthalate (PET), and polypropylene (PP), for example. A structure of the base material is not particularly limited, however, a fiber material having fibers such as a woven cloth, a knitting cloth, and a non-woven cloth, for example, may be applicable, and also applicable is a non-fiber material which does not have fibers such as a member made up by extrusion molding or injection molding. When the base material is a non-fiber material made up by extrusion molding or injection molding, a foam made up by foam molding or a solid material which is not foam-molded but is uniformly solid may also be applicable.

Considering that the first layer 21 has a role as a base of the wiring member 10, it is sufficient that the first layer 21 is excellent in tensile strength than the second layer 22, for example. Considering that the second layer 22 is a layer mediating a bonding of the first layer 21 and the wire-like transmission member 30, it is sufficient that the second layer 22 is fixed to the wire-like transmission member 30 with strength larger than the first layer 21. Adoptable as an example of such a combination is a case where the first layer 21 is a non-woven sheet, a woven sheet, and a knitted sheet, and a base resin of the second layer 22 is the same as a base resin constituting a surface (the covering 34) of the wire-like transmission member 30. In this case, when a constituent fiber excellent in the tensile strength is used in the first layer 21, the first layer 21 can be relatively soft and excellent in the tensile strength, thus such a fiber is appropriate as a base material functioning as a base. A minute gap caused by the fiber, for example, is formed in the surface of the first layer 21, thus when the second layer 22 melted by heat, for example, fills the gap, and is then hardened, the first layer 21 and the second layer 22 can be relatively firmly bonded. That is to say, the first layer 21 and the second layer 22 can be relatively firmly bonded by a type of anchor effect. In this case, a melting point of the first layer 21 is higher than that of the second layer 22, thus the second layer 22 is melted to fill the gap of the first layer 21 easily.

A material which does not relate to resin constituting the surface of the wire-like transmission member 30 can be used as a material constituting the first layer 21. For example, PP, PET, or PE, for example, may be used as the resin constituting the first layer 21 when the surface of the wire-like transmission member 30 is formed by PVC. When the base resin of the resin of the second layer 22 is the same as that constituting the surface of the wire-like transmission member 30, the wire-like transmission member 30 can be relatively firmly bonded to the second layer 22 by welding the wire-like transmission member 30 to the second layer 22, for example. For example, when the base resin of the covering 34 on an outer periphery of the wire-like transmission member 30 is PVC, it is sufficient that the base resin of the second layer 22 is PVC. Also based on an assumption of a case where the wire-like transmission member 30 is fixed to the second layer 22 by an adhesive agent, the adhesive agent generally has favorable adhesion properties on a member having favorable compatibility (affinity), and particularly has favorable adhesion properties on the same system of resin. Thus, when the base resin of the resin of the second layer 22 is the same as that constituting the surface of the wire-like transmission member 30, the wire-like transmission member 30 and the second layer 22 can be relatively firmly bonded by using an adhesive agent appropriate for the base resin.

There is a portion where the fixing positions W are alternately located in a region where the plurality of wire-like transmission members 30 are parallelly arranged. The plurality of wire-like transmission members 30 include a first wire-like transmission member and a second wire-like transmission member. The first wire-like transmission member is fixed to the sheet 20 at a plurality of first positions. At least one first wire-like transmission member is included. The second wire-like transmission member is fixed to the sheet 20 at a plurality of second positions. At least one second wire-like transmission member is included. The first positions and the second positions are alternately provided along an extension direction in a region where the first wire-like transmission member and the second wire-like transmission member are parallelly arranged. In the present example, the plurality of first wire-like transmission members are fixed at the first position, and the plurality of second wire-like transmission members are fixed at the second position.

In the example illustrated in FIG. 1, the wire-like transmission members 30a, 30b, 30c, 30d, 30e, and 30f are parallelly arranged in a region A1. In the region A1, a relationship between the wire-like transmission members 30a, 30b, and 30c and the wire-like transmission members 30d, 30e, and 30f is similar to a relationship between the first wire-like transmission member and the second wire-like transmission member. That is to say, the wire-like transmission members 30a, 30b, and 30c are fixed to the partial second layers 23 and 25 in the region A1. The wire-like transmission members 30d, 30e, and 30f are fixed to the partial second layer 24 in the region A1. The partial second layer 24 is located between the partial second layers 23 and 25. Thus, the fixing position W where the wire-like transmission members 30a, 30b, and 30c are fixed to the sheet 20 and the fixing position W where the wire-like transmission members 30d, 30e, and 30f are fixed to the sheet 20 are alternately located along the extension direction of the wire-like transmission member 30 in the region A1.

In the example illustrated in FIG. 1, the wire-like transmission members 30a, 30b, 30c, 30d, 30g, and 30h are parallelly arranged in a region A2. In the region A2, a relationship between the wire-like transmission members 30a, 30b, and 30c and the wire-like transmission members 30d, 30g, and 30h is similar to a relationship between the first wire-like transmission member and the second wire-like transmission member. That is to say, the wire-like transmission members 30a, 30b, and 30c are fixed to the partial second layers 26 and 28 in the region A2. The wire-like transmission members 30d, 30g, and 30h are fixed to the partial second layer 27 in the region A2. The partial second layer 27 is located between the partial second layers 26 and 28. Thus, the fixing position W where the wire-like transmission members 30a, 30b, and 30c are fixed to the sheet 20 and the fixing position W where the wire-like transmission members 30d, 30g, and 30h are fixed to the sheet 20 are alternately located along the extension direction of the wire-like transmission member 30 in the region A2.

In the example illustrated in FIG. 1, the wire-like transmission members 30a, 30b, 30c, and 30d are parallelly arranged in a region A3. The wire-like transmission members 30a, 30b, and 30c and the wire-like transmission member 30d are parallelly arranged in a whole region from one end portion to the other end portion of the sheet 20 on the sheet 20. In the region A3, a relationship between the wire-like transmission members 30a, 30b, and 30c and the wire-like transmission member 30d is similar to a relationship between the first wire-like transmission member and the second wire-like transmission member. That is to say, the wire-like transmission members 30a, 30b, and 30c are fixed to the partial second layers 23, 25, 26, and 28 in the region A3. The wire-like transmission member 30d is fixed to the partial second layers 24 and 27 in the region A3. The partial second layer 24 is located between the partial second layers 23 and 25, and the partial second layer 27 is located between the partial second layers 26 and 28. Thus, the fixing position W where the wire-like transmission members 30a, 30b, and 30c are fixed to the sheet 20 and the fixing position W where the wire-like transmission member 30d is fixed to the sheet 20 are alternately located along the extension direction of the wire-like transmission member 30 in the region A3.

The wire-like transmission member 30d is not fixed to the sheet 20 between the partial second layers 25 and 26 in the region A3. In this manner, the first fixing position in the first wire-like transmission member and the second fixing position in the second wire-like transmission member need not be alternately located completely over the whole region where the wire-like transmission members are parallelly arranged.

The fixing position W in the wire-like transmission member 30a and the fixing position W in the wire-like transmission member 30f are alternately located in the region A1. There is a positional relationship between the wire-like transmission member 30a and the wire-like transmission member 30f that they are located farthest away from each other in the plurality of wire-like transmission members 30 parallelly arranged in the region A1. It is preferable that the fixing positions W in the two wire-like transmission members 30 located farthest away from each other in the plurality of wire-like transmission members 30 parallelly arranged are alternately located as described above. The reason is that if the two wire-like transmission members 30 located farthest away from each other snaggle with each other, tensile force on the fixing position W increases in accordance with the snaggle, and there is a high possibility that the fixing state in the fixing position W is released. In the present example, the fixing positions W in the two wire-like transmission members 30 located farthest away from each other in the plurality of wire-like transmission members 30 parallelly arranged are alternately located also in the regions A2 and A3.

From the similar viewpoint, it is preferable that the fixing positions W in the two wire-like transmission members 30 located second farthest away from each other in the plurality of wire-like transmission members 30 parallelly arranged are also alternately located. For example, there is a positional relationship between the wire-like transmission member 30a and the wire-like transmission member 30e that they are located second farthest away from each other after the positional relationship between the wire-like transmission member 30a and the wire-like transmission member 30f in the region A1. The fixing position W in the wire-like transmission member 30a and the fixing position W in the wire-like transmission member 30e are alternately located in the region A1. There is a positional relationship between the wire-like transmission member 30b and the wire-like transmission member 30f that they are also located second farthest away from each other after the positional relationship between the wire-like transmission member 30a and the wire-like transmission member 30f in the region A1. The fixing position W in the wire-like transmission member 30b and the fixing position W in the wire-like transmission member 30f are alternately located. In the present example, the fixing positions W in the two wire-like transmission members 30 located second farthest away from each other in the plurality of wire-like transmission members 30 parallelly arranged are alternately located also in the region A2.

The partial second layer which can fix the other wire-like transmission member 30 is located on a lateral side of at least one of the partial second layer in the first position and the partial second layer in the second position. Specifically, the wire-like transmission members 30a, 30b, and 30c are fixed to the partial second layers 23, 25, 26, and 28. The partial second layers 23, 25, 26, and 28 are formed to have a size substantially equal to (herein, slightly smaller than) a width dimension of the sheet 20. From the other viewpoint, the partial second layers 23 and 25 are formed to have a size large enough to overlap with the wire-like transmission members 30d, 30e, and 30f which are not fixed to the partial second layers 23 and 25. The partial second layers 26 and 28 are formed to have a size large enough to overlap with the wire-like transmission members 30d, 30g, and 30h which are not fixed to the partial second layers 26 and 28. The wire-like transmission members 30d, 30e, 30f, 30g, and 30h are not fixed to the partial second layers 23, 25, 26, and 28. Thus, the partial second layers 23, 25, 26, and 28 include a portion which can fix the other wire-like transmission member 30.

In the similar manner, the wire-like transmission members 30d, 30e, and 30f are fixed to the partial second layer 24. The wire-like transmission members 30d, 30g, and 30h are fixed to the partial second layer 27. The partial second layers 24 and 27 are formed to have a size substantially equal to (herein, slightly smaller than) the width dimension of the sheet 20. From the other viewpoint, the partial second layers 24 and 27 are formed to have a size large enough to overlap with the wire-like transmission members 30a, 30b, and 30c which are not fixed to the partial second layers 24 and 27. The wire-like transmission members 30a, 30b, and 30c are not fixed to the partial second layers 24 and 27. Thus, the partial second layers 24 and 27 include a portion which can fix the other wire-like transmission member 30.

<Method of Repairing Wiring Member 10>

Figure 5:
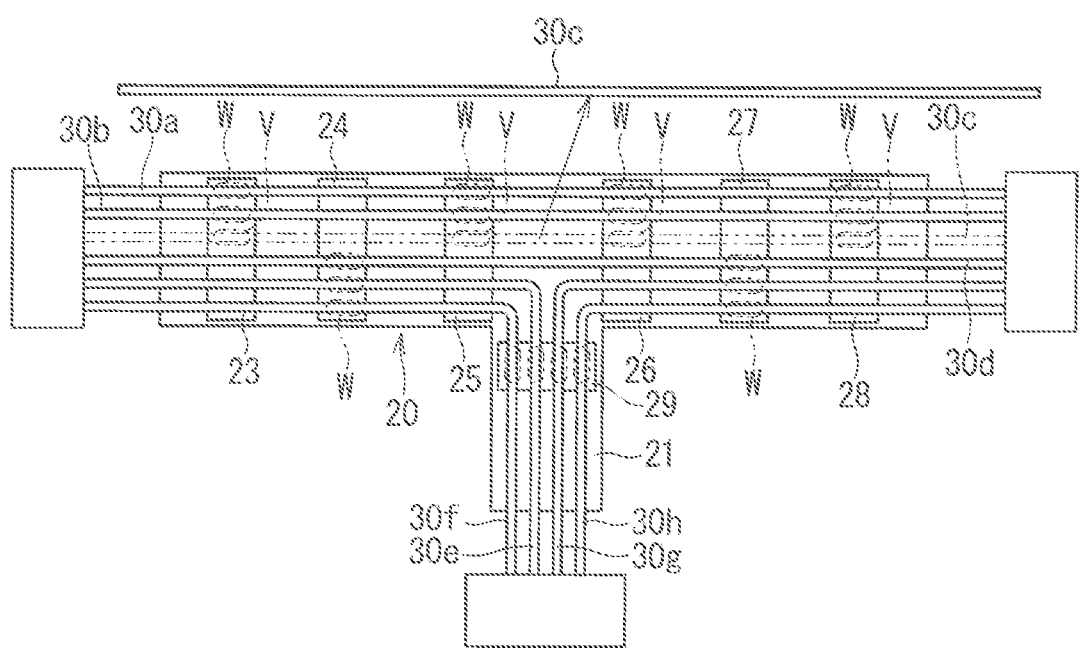
FIG. 5 is an explanation diagram illustrating a state where a wire-like transmission member is detached in the wiring member.
Figure 6:
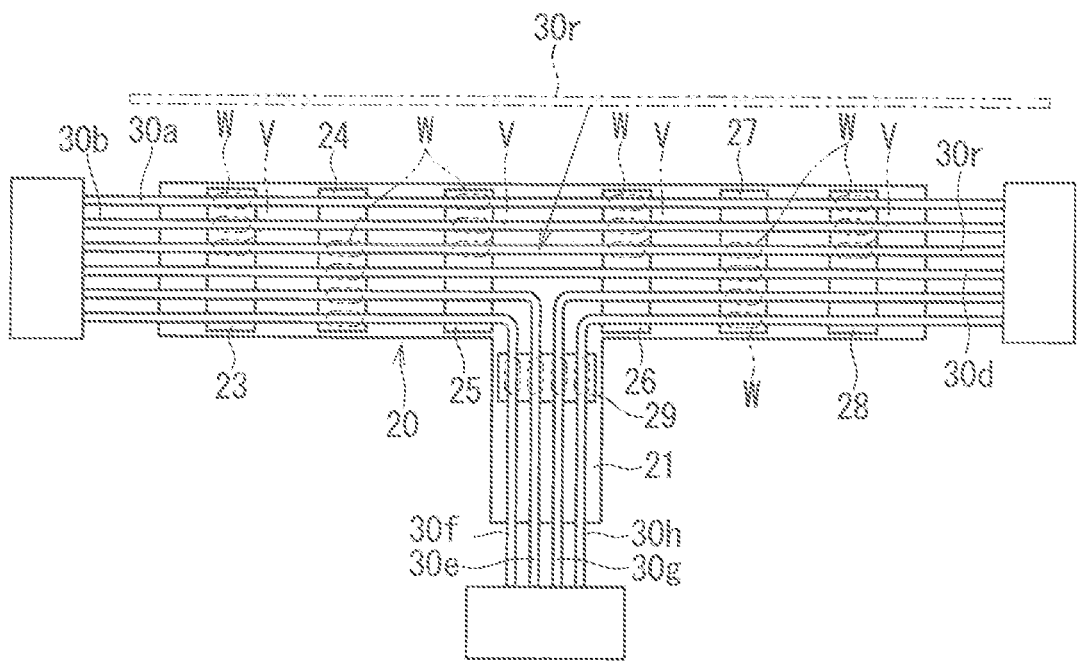
FIG. 6 is an explanation diagram illustrating a state where the wire-like transmission member is attached again in the wiring member.

A method of repairing the wiring member 10 is described with reference to FIG. 5 and FIG. 6. FIG. 5 is an explanation diagram illustrating a state where the wire-like transmission member 30 is detached in the wiring member 10. FIG. 6 is an explanation diagram illustrating a state where the wire-like transmission member 30 is attached again in the wiring member 10.

Assumed is a case where some wire-like transmission member 30 is detached from the sheet 20 when a defect partially occurs in the wiring member 10. In this case, a repaid component of the wire-like transmission member 30 is desired to be attached to the sheet 20 again after the repair. There may be a case where a repaired component is a reused wire-like transmission member 30 which has been detached from the sheet 20 or a replaced component. When the sheet 20 and the wire-like transmission member 30 are fixed by welding herein, there may be a case where the welding part is broken when the wire-like transmission member 30 is peeled from the sheet 20. Accordingly, there may be a case where the wire-like transmission member 30 cannot be welded again to a position where the welding part has been located in the sheet 20. In such a case, when the second layer (the partial second layer) includes a vacant space, the wire-like transmission member 30 can be welded to the sheet 20 again.

Specifically, the wire-like transmission member 30c in the wiring member 10 is detached from the sheet 30 in the example illustrated in FIG. 5. When the wire-like transmission member 30c is detached from the sheet 20, the welding part where the partial second layers 23, 25, 26, and 28 and the wire-like transmission member 30c are welded is broken, and the partial second layers 23, 25, 26, and 28 may partially adhere to the wire-like transmission member 30. In this case, the welding part where the partial second layers 23, 25, 26, and 28 and the wire-like transmission member 30c have been welded in the sheet 20 remains as a trace V in a state where the wire-like transmission member 30c is detached from the sheet 20 (refer to FIG. 6).

A wire-like transmission member (a repaired component) 30r which has been repaired is attached to the sheet 20 again in place of the wire-like transmission member 30c which has been detached from the sheet 20 as illustrated in FIG. 6. The partial second layers 23, 25, 26, and 28 are broken in a position of the trace V in the sheet 20. Thus, the repaired component 30r is fixed to a fixing position W in the sheet 20 different from that of the wire-like transmission member 30 in the wiring member 10.

In the example illustrated in FIG. 6, the repaired component 30r is fixed to the partial second layers 24 and 27 different from the partial second layers 23, 25, 26, and 28 where the corresponding wire-like transmission member 30c is fixed before the repair. More specifically, the repaired component 30r is welded to a vacant portion of the partial second layer 24 provided on a lateral side of the wire-like transmission members 30d, 30e, and 30f. The repaired component 30r is welded to a vacant portion of the partial second layer 27 provided on a lateral side of the wire-like transmission members 30d, 30g, and 30h. Accordingly, a route of the repaired component 30r can be substantially the same as a route of the corresponding wire-like transmission member 30c before the repair.

In the example illustrated in FIG. 6, the repaired component 30r is arranged in parallel over the entire length of the wire-like transmission member 30d in the repaired wiring member 10, and fixed to the same partial second layers 24 and 27. Thus, in the wiring member 10, a relationship between the wire-like transmission members 30a and 30b and the wire-like transmission members 30d, 30e, 30f, 30g, and 30r is similar to a relationship between the first wire-like transmission member and the second wire-like transmission member. In this manner, when the repaired component 30r is fixed to the partial second layers 24 and 27 different from the partial second layers 23, 25, 26, and 28 to which the corresponding wire-like transmission member 30c has been fixed before the repair, the relationship between the first wire-like transmission member and the second wire-like transmission member in the wiring member 10 before the repair may be changed in the wiring member 10 after the repair.

The partial second layers 23, 25, 26, and 28 also include a vacant portion where the wire-like transmission member 30 is not welded to a portion overlapping with the wire-like transmission members 30d, 30e, 30f, 30g, and 30h. The repaired component 30r may be welded to this vacant portion in the partial second layers 23, 25, 26, and 28. That is to say, the repaired component 30r may be welded to a vacant position in the partial second layers 23, 25, 26, and 28 to which the corresponding wire-like transmission member 30c has been fixed before the repair. In this case, the repaired component 30r can be fixed to the sheet 20 at substantially the same position as the corresponding wire-like transmission member 30c before the repair. Accordingly, the relationship between the first wire-like transmission member and the second wire-like transmission member in the wiring member 10 before the repair is maintained also in the wiring member 10 after the repair.

<Effect etc. of Embodiments>

According to the wiring member 10 having such a configuration, the interval between the positions in the wire-like transmission member 30 fixed to the sheet 20 can be increased, thus the number of fixing positions W can be reduced, and the wiring member 10 can be manufactured easily. There is a portion where the fixing positions W are alternately provided, thus even when the interval between the fixing positions W increases, the portion between the fixing positions W hardly snaggles with the other wire-like transmission members parallelly arranged. As a result, the wiring member 10 in which the wire-like transmission member 30 is fixed to the sheet 20 can be simply manufactured while keeping the wire-like transmission member 30 to be appropriately held by the sheet 20.

The plurality of first wire-like transmission members are fixed in the first position and the plurality of second wire-like transmission members are fixed in the second position, thus the positions where the plurality of wire-like transmission members 30 are fixed can be alternately provided. The plurality of wire-like transmission members can be fixed at a time, thus the wiring member 10 can be simply manufactured. There is a possibility that the portion between the fixing positions W snaggles in the plurality of wire-like transmission members 30 fixed to the same position. However, the positions where the plurality of wire-like transmission members 30 are fixed are alternately located, thus the number of wire-like transmission members 30 which may snaggle is reduced. Thus, even when they snaggle, the snaggling portion is easily released. For example, there is a possibility that the wire-like transmission member 30a, the wire-like transmission member 30b, and the wire-like transmission member 30c snaggle with each other between the partial second layers 23 and 25. However, the wire-like transmission members 30d, 30e, and 30f are fixed to the partial second layer 24, thus the wire-like transmission members 30a, 30b, and 30c hardly snaggle with the wire-like transmission members 30d, 30e, and 30f between the partial second layers 23 and 25. That is to say, even when the wire-like transmission members 30a, 30b, and 30c snaggle with each other between the partial second layers 23 and 25, the snaggle is made up of only the wire-like transmission members 30a, 30b, and 30c, thus the snaggling state is easily released.

The partial second layer includes a portion which is not bonded to the wire-like transmission member 30 in the wiring member 10. When the repaired component is bonded to the sheet 20 again after the wire-like transmission member 30 which needs to be repaired is detached from the sheet 20 in the wiring member 10, the repaired component can be bonded using the vacant partial second layer.

MODIFICATION EXAMPLE

Figure 7:
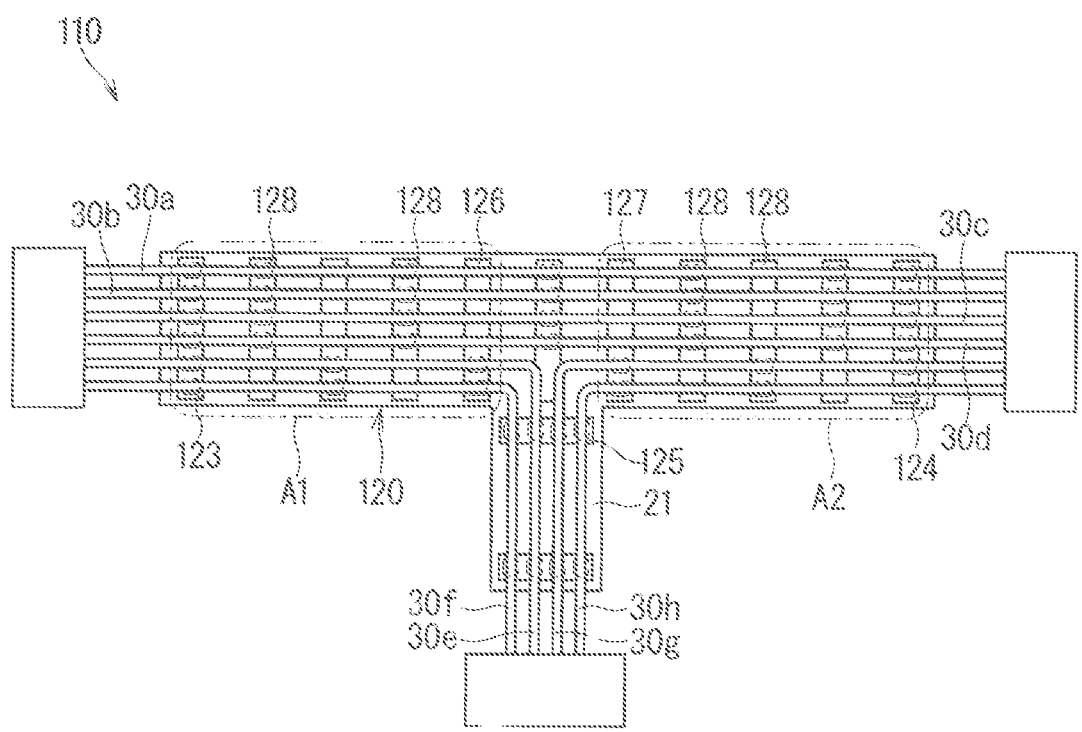
FIG. 7 is a plan view illustrating a modification example of the wiring member.

FIG. 7 is a plan view illustrating a modification example of the wiring member 10. A wiring member 110 illustrated in FIG. 7 is different from the wiring member 10 described above in the position where the partial second layer is provided in the sheet 120 and the fixing position W where the wire-like transmission member 30 is fixed to the partial second layer.

All of the wire-like transmission members 30 parallelly arranged may be fixed to the same position (the same partial second layer) along the extension direction as with the wiring member 110. In the example illustrated in FIG. 7, the wire-like transmission members 30a, 30b, 30c, 30d, 30e, and 30f are fixed to the same partial second layer 123 in one end portion in the region A1 (one end portion of the sheet 120). The wire-like transmission members 30a, 30b, 30c, 30d, 30g, and 30h are fixed to the same partial second layer 124 in one end portion in the region A3 (the other end portion of the sheet 120). Needless to say, all of the wire-like transmission members 30 parallelly arranged may be fixed to the partial second layer located in a middle portion in the region where the plurality of wire-like transmission members 30 are parallelly arranged.

Both end portions of a curved part may be fixed to the sheet 20 in the wire-like transmission member 30 having the curved part. In the example illustrated in FIG. 7, parts of two straight parts in the wire-like transmission members 30e and 30f closer to the curved part are fixed to the partial second layers 125 and 126, respectively. Parts of two straight parts in the wire-like transmission members 30g and 30h closer to the curved part are fixed to the partial second layers 125 and 127, respectively.

The wire-like transmission members 30 parallelly arranged over the entire length on the sheet 120 may be fixed to the same position (the same partial second layer) along the extension direction. In the example illustrated in FIG. 7, the wire-like transmission members 30a, 30b, 30c, and 30d are fixed to the same partial second layers 123, 124, 126, 127, and 128. In the wiring member 110, the fixing positions W are alternately located between the wire-like transmission members 30 partially arranged in parallel and partially having route different from each other as with the wire-like transmission members 30a, 30b, 30c, and 30d and the wire-like transmission members 30e and 30f.

In the above description, the plurality of wire-like transmission members 30 are fixed to the sheets 20 and 120 in the fixing position W along the extension direction, however, this configuration is not necessary. The plurality of wire-like transmission members 30 are fixed to the sheets 20 and 120 one by one in different positions.

In the above description, the sheets 20 and 120 include the first layer 21 and the second layer 22, however, this configuration is not necessary. The sheet may have a single structure. In this case, the wire-like transmission member 30 can be welded to an optional position in a single-layered sheet. Even in the case where the sheets 20 and 120 include the first layer 21 and the second layer 22, a configuration that the second layer 22 includes the plurality of partial second layers is not necessary. The second layer 22 may be wholly provided on the first layer 21. In this case, the wire-like transmission member 30 can be welded to an optional position in the second layer 22 in the sheet.

In the above description, the sheet and the wire-like transmission member 30 are welded as the example of fixing the sheet and the wire-like transmission member 30, however, this configuration is not necessary. For example, the sheet and the wire-like transmission member 30 may be fixed in a bonding form other than welding by an adhesive agent or a double-sided tape. For example, the sheet and the wire-like transmission member 30 may be fixed by sewing the wire-like transmission member 30 to the sheet with a sewing thread. It is also applicable that an adhesive tape is attached to a portion from a side of one main surface of the sheet across the wire-like transmission member 30 in a state where the wire-like transmission member 30 is disposed on one main surface of the sheet to fix the wire-like transmission member 30 to one main surface of the sheet, for example. For example, the wire-like transmission member 30 may be sandwiched between the sheet and the other sheet, thereby being fixed to the sheet. In this case, a configuration for fixing the two sheets sandwiching the wire-like transmission member 30 is not particularly limited. The two sheets sandwiching the wire-like transmission member 30 may be fixed by welding, or may also be fixed by an adhesive agent or a double-sided tape.

The fixing structure of fixing the sheet and the wire-like transmission member 30 can also be applied to the fixing structure of fixing the sheet and the repaired component. That is to say, in the above description, the repaired component is attached to the sheet again by welding in repairing the wiring member, however, this configuration is not necessary. The various fixing structures described above such as pressing with a single-sided adhesive tape or sewing with a sewing thread other than welding may be adopted as the fixing structure of fixing the repaired component and the sheet. In this case, the vacant partial second layer needs not be provided in the wiring member 10 before the repair.

The wire-like transmission member 30 needs not be fixed to only one main surface of the sheet. The wire-like transmission member 30 may include both a part fixed to one main surface of the sheet and a part fixed to the other main surface of the sheet. In this case, the wire-like transmission member 30 may be provided to pass from one main surface toward the other main surface in a middle portion or an end edge portion of the sheet.

Each configuration described in the embodiments and modification examples thereof can be appropriately combined as long as they are not contradictory.

EXPLANATION OF REFERENCE SIGNS 10, 110 wiring member
20, 120 sheet
21 first layer
22 second layer
23, 24, 25, 26, 27, 28, 29, 123, 124, 125, 126, 127, 128 partial second layer
30, 30a, 30b, 30c, 30d, 30e, 30f, 30g, 30h wire-like transmission member
32 transmission wire body
34 covering
C connector
A1, A2, A3 region
W fixing position

The invention claimed is:

1. A wiring member, comprising:
   a sheet; and
   a plurality of wire-like transmission members disposed on the sheet, wherein
   each of the plurality of wire-like transmission members has a shape of a wire and transmits at least one of electrical power or light,
   the plurality of wire-like transmission members include at least one first wire-like transmission member fixed to the sheet at a plurality of first positions and at least one second wire-like transmission member fixed to the sheet at a plurality of second positions,
   the first positions and the second positions are alternately provided along an extension direction of the wire-like transmission members in a region where the at least one first wire-like transmission member and the at least one second wire-like transmission member are parallelly arranged, the sheet includes a first layer formed into a sheet-like shape and a second layer provided on a main surface of the first layer, the second layer is a layer mediating a bonding between the first layer and the wire-like transmission members, an entire lower main surface of the second layer contacts the main surface of the first layer, the second layer includes a plurality of partial second layers provided to be mutually separated in the extension direction of the wire-like transmission members, both of the at least one first wire-like transmission member and the at least one second wire-like transmission member are provided on the partial second layer provided at the first positions, and the at least one first wire-like transmission member is fixed to the partial second layer provided at the first positions and the at least one second wire-like transmission member is not fixed to the partial second layer at the first positions, and both of the at least one first wire-like transmission member and the at least one second wire-like transmission member are provided on the partial second layer provided at the second position, and the at least one second wire-like transmission member is fixed to the partial second layer at the second positions and the at least one first wire-like transmission member is not fixed to the partial second layer provided at the second positions.

2. The wiring member according to claim 1, wherein
the at least one first wire-like transmission member comprises a plurality of first wire-like transmission members,
the at least one second wire-like transmission member comprises a plurality of second wire-like transmission members,
the plurality of first wire-like transmission members are fixed at the first positions, and
the plurality of second wire-like transmission members are fixed at the second positions.

3. The wiring member according to claim 1, wherein
one of the partial second layers provided at the first positions includes a first area where the at least one first wire-like transmission member is fixed and a second area where the at least one first wire-like transmission member is not fixed,
the second area is located on a lateral side of the first area and a width of the second area is greater than a width of each of the wire-like transmission members.

4. A wiring member, comprising:
a sheet; and
a plurality of wire-like transmission members disposed on the sheet, wherein
each of the plurality of wire-like transmission members has a shape of a wire and transmits at least one of electrical power or light,
the plurality of wire-like transmission members include at least one first wire-like transmission member fixed to the sheet at a plurality of first positions and at least one second wire-like transmission member fixed to the sheet at a plurality of second positions,
the first positions and the second positions are alternately provided along an extension direction, in which the wire-like transmission members extend longitudinally, in a region where the at least one first wire-like transmission member and the at least one second wire-like transmission member are parallelly arranged, the sheet includes a first layer formed into a sheet-like shape and a second layer provided on a main surface of the first layer, the second layer is a layer mediating a bonding between the first layer and the wire-like transmission members, and includes a plurality of partial second layers provided to be mutually separated in the extension direction, in which the wire-like transmission members extend longitudinally, and one of the partial second layers provided at the first positions includes a first area where the at least one first wire-like transmission member is fixed and a second area where the at least one first wire-like transmission member is not fixed, the second area is located on a lateral side of the first area and a width of the second area is greater than a width of each of the wire-like transmission members, both of the at least one first wire-like transmission member and the at least one second wire-like transmission member are provided on the partial second layer provided at the first positions, and the at least one first wire-like transmission member is fixed to the partial second layer provided at the first positions and the at least one second wire-like transmission member is not fixed to the partial second layer at the first positions, and both of the at least one first wire-like transmission member and the at least one second wire-like transmission member are provided on the partial second layer provided at the second position, and the at least one second wire-like transmission member is fixed to the partial second layer at the second positions and the at least one first wire-like transmission member is not fixed to the partial second layer provided at the second positions.

5. A wiring member, comprising:
a sheet; and
a plurality of wire-like transmission members disposed on the sheet, wherein
each of the plurality of wire-like transmission members has a shape of a wire and transmits at least one of electrical power or light,
the plurality of wire-like transmission members include at least one first wire-like transmission member fixed to the sheet at a plurality of first positions and at least one second wire-like transmission member fixed to the sheet at a plurality of second positions,
the first positions and the second positions are alternately provided along an extension direction of the wire-like transmission members in a region where the at least one first wire-like transmission member and the at least one second wire-like transmission member are parallelly arranged,
the at least one first wire-like transmission member comprises a plurality of first wire-like transmission members,
the at least one second wire-like transmission member comprises a plurality of second wire-like transmission members,
the plurality of first wire-like transmission members are fixed to the sheet at the first positions, and
the plurality of second wire-like transmission members are fixed to the sheet at the second positions,
the second layer includes a plurality of partial second layers provided to be mutually separated in the extension direction of the wire-like transmission members, both of the at least one first wire-like transmission member and the at least one second wire-like transmission member are provided on the partial second layer provided at the first positions, and the at least one first wire-like transmission member is fixed to the partial second layer provided at the first positions and the at least one second wire-like transmission member is not fixed to the partial second layer at the first positions, and both of the at least one first wire-like transmission member and the at least one second wire-like transmission member are provided on the partial second layer provided at the second position, and the at least one second wire-like transmission member is fixed to the partial second layer at the second positions and the at least one first wire-like transmission member is not fixed to the partial second layer provided at the second positions.

6. The wiring member according to claim 5, wherein each of the first wire-like transmission members contacts and is fixed to the sheet at the first positions, and each of the second wire-like transmission members contacts and is fixed to the sheet at the second positions.

\* \* \* \* \*